(12) United States Patent
Olsen

(10) Patent No.: US 10,415,319 B2
(45) Date of Patent: Sep. 17, 2019

(54) LOW SURFACE FRICTION DRILL BIT BODY FOR USE IN WELLBORE FORMATION

(71) Applicant: Halliburton Energy Services, Inc., Houston, TX (US)

(72) Inventor: Garrett T. Olsen, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 197 days.

(21) Appl. No.: 15/117,622

(22) PCT Filed: Mar. 12, 2014

(86) PCT No.: PCT/US2014/024926
§ 371 (c)(1),
(2) Date: Aug. 9, 2016

(87) PCT Pub. No.: WO2015/137946
PCT Pub. Date: Sep. 17, 2015

(65) Prior Publication Data
US 2016/0348444 A1 Dec. 1, 2016

(51) Int. Cl.
*E21B 10/46* (2006.01)
*E21B 10/00* (2006.01)
(Continued)

(52) U.S. Cl.
CPC ............ *E21B 10/50* (2013.01); *B22F 3/1055* (2013.01); *B22F 7/06* (2013.01); *B28B 11/243* (2013.01);
(Continued)

(58) Field of Classification Search
CPC .......... B33Y 10/00; B22F 3/1055; B22F 3/06; C04B 35/5626; C04B 35/63408;
(Continued)

(56) References Cited

U.S. PATENT DOCUMENTS 2,187,086 A  1/1940  Koerhing
2,846,252 A  8/1958  Herbenar
(Continued)

FOREIGN PATENT DOCUMENTS

CN  102489699  6/2012

OTHER PUBLICATIONS

International Search Report and Written Opinion, Application No. PCT/US2014/024926; 15 pgs., dated Dec. 10, 2014.
(Continued)

*Primary Examiner* — Cathleen R Hutchins
*Assistant Examiner* — Yanick A Akaragwe
(74) *Attorney, Agent, or Firm* — Baker Botts L.L.P.

(57) ABSTRACT

A low surface friction body for a drill bit includes a matrix drill bit body. The body includes a particulate phase having a friction-reducing additive, and a binding material that bonds the particulate phase using a suitable manufacturing process such as selective laser sintering. The particulate phase may include tungsten carbide, the friction-reducing additive may be polytetrafluoroethylene, and the binder material may be copper or cobalt. The friction-reducing additive is distributed throughout at least a portion of the drill bit body that includes the surface that will come into contact with drill cuttings and drilling fluid during operation. The molecular properties of the friction-reducing additive result in a drill bit body having a surface that is resistant to sticking even after enduring chipping and other types of wear.

9 Claims, 8 Drawing Sheets

(51) Int. Cl.

| | |
|---|---|
| *E21B 10/50* | (2006.01) |
| *B33Y 10/00* | (2015.01) |
| *B33Y 80/00* | (2015.01) |
| *B22F 3/105* | (2006.01) |
| *B22F 7/06* | (2006.01) |
| *B28B 11/24* | (2006.01) |
| *C04B 35/56* | (2006.01) |
| *C04B 35/634* | (2006.01) |
| *C04B 35/64* | (2006.01) |
| *B22F 5/00* | (2006.01) |

(52) U.S. Cl.
CPC ............... *B33Y 10/00* (2014.12); *B33Y 80/00* (2014.12); *C04B 35/5626* (2013.01); *C04B 35/63408* (2013.01); *C04B 35/64* (2013.01); *E21B 10/00* (2013.01); *E21B 10/46* (2013.01); *B22F 2005/001* (2013.01); *B22F 2301/10* (2013.01); *B22F 2301/15* (2013.01); *B22F 2302/10* (2013.01); *B22F 2302/45* (2013.01); *C04B 2235/3847* (2013.01); *C04B 2235/48* (2013.01); *C04B 2235/661* (2013.01); *C04B 2235/665* (2013.01)

(58) Field of Classification Search
CPC .............. C04B 35/64; C04B 2235/665; C04B 2235/661; C04B 2235/48; C04B 2235/3847; E21B 10/50; E21B 10/00; E21B 10/46
See application file for complete search history.

(56) References Cited

U.S. PATENT DOCUMENTS

| | | | |
|---|---|---|---|
| 4,491,477 A | | 1/1985 | Suganuma |
| 4,685,359 A | * | 8/1987 | Worthen ............... B23K 35/327 |
| | | | 76/108.2 |
| 5,352,526 A | * | 10/1994 | Solanki .............. B23K 35/0238 |
| | | | 156/62.8 |
| 5,938,814 A | | 8/1999 | Uenosono et al. |
| 6,450,271 B1 | | 9/2002 | Tibbitts et al. |
| 2003/0066391 A1 | * | 4/2003 | Griffo ................... C23C 30/005 |
| | | | 76/108.2 |
| 2008/0121436 A1 | | 5/2008 | Slay et al. |
| 2010/0192475 A1 | | 8/2010 | Stevens et al. |
| 2011/0048809 A1 | | 3/2011 | Duckworth et al. |
| 2011/0239545 A1 | | 10/2011 | Stevens et al. |
| 2012/0005966 A1 | * | 1/2012 | Cleboski ................ E21B 10/46 |
| | | | 51/295 |
| 2014/0041946 A1 | * | 2/2014 | Holtzman ........... E21B 17/1078 |
| | | | 175/325.5 |

OTHER PUBLICATIONS

Office Action received for Chinese Patent Application No. 201480071439.1, dated May 19, 2017; 7 pages.
Office Action received for Chinese Patent Application No. 201480071439.1, dated Dec. 18, 2017; 6 pages.
International Preliminary Report on Patentability for PCT Patent Application No. PCT/US2014/024926, dated Sep. 22, 2016; 11 pages.
Office Action for Canadian Patent Application No. 2936496, dated Sep. 21, 2017; 4 pages.

* cited by examiner

LOW SURFACE FRICTION DRILL BIT BODY FOR USE IN WELLBORE FORMATION

RELATED APPLICATIONS

This application is a U.S. National Stage Application of International Application No. PCT/US2014/024926 filed Mar. 12, 2014, which designates the United States, and which is incorporated herein by reference in its entirety.

TECHNICAL FIELD

The present disclosure generally relates to tooling and equipment used to form wellbores for extracting hydrocarbons from a geological formation and, more particularly, to drill bit bodies that include low friction surfaces.

DESCRIPTION OF RELATED ART

Wells are drilled to access and produce oil, gas, minerals, and other naturally-occurring deposits from subterranean geological formations. The drilling of a well typically is accomplished with a drill bit that is rotated to advance the wellbore by removing topsoil, sand, clay, limestone, calcites, dolomites, or other materials from a formation. Pieces of such materials removed from the formation by the drill bit are generally referred to as "cuttings" or "drill cuttings."

A drill bit is typically classified as either a fixed cutter drill bit or a rotary cone drill bit, which may also be referred to as a roller cone drill bit. Generally, a rotary cone drill bit includes a drill bit body having multiple rotating cones (i.e., "roller cones") with cutting elements. The roller cones rotate relative to the bit body as the drill bit is rotated downhole. In contrast, a fixed cutter drill bit includes a drill bit body having cutting elements at fixed locations on the exterior of the drill bit body. The cutting elements remain at their fixed locations relative to the bit body as the drill bit is rotated downhole.

During drilling, the drill bit experiences some of the most intense strains and pressures of any component in the drill string. Some of the focus in bit design is to strengthen and increase the durability of drill bits. In some cases, material selection drives the durability of the drill bit, and steel bits and tungsten carbide bits have become popular because of their durability.

Fixed cutter and roller cone bit bodies are often formed of matrix materials, and referred to, accordingly, as a matrix bit body. The materials used to form a matrix bit body may include a powder, which is typically a hard and durable material, and a binder material that holds the powder together to form the bit. Since the resulting matrix in many cases does not chemically bond the powder component and the binder together, the matrix drill bit may be susceptible to fracturing or other types of damage if it experiences sufficient chipping or other types of wear.

BRIEF DESCRIPTION OF THE FIGURES

Illustrative embodiments of the present disclosure are described in detail below with reference to the attached drawing figures, which are incorporated by reference herein and wherein.

Figure 1:
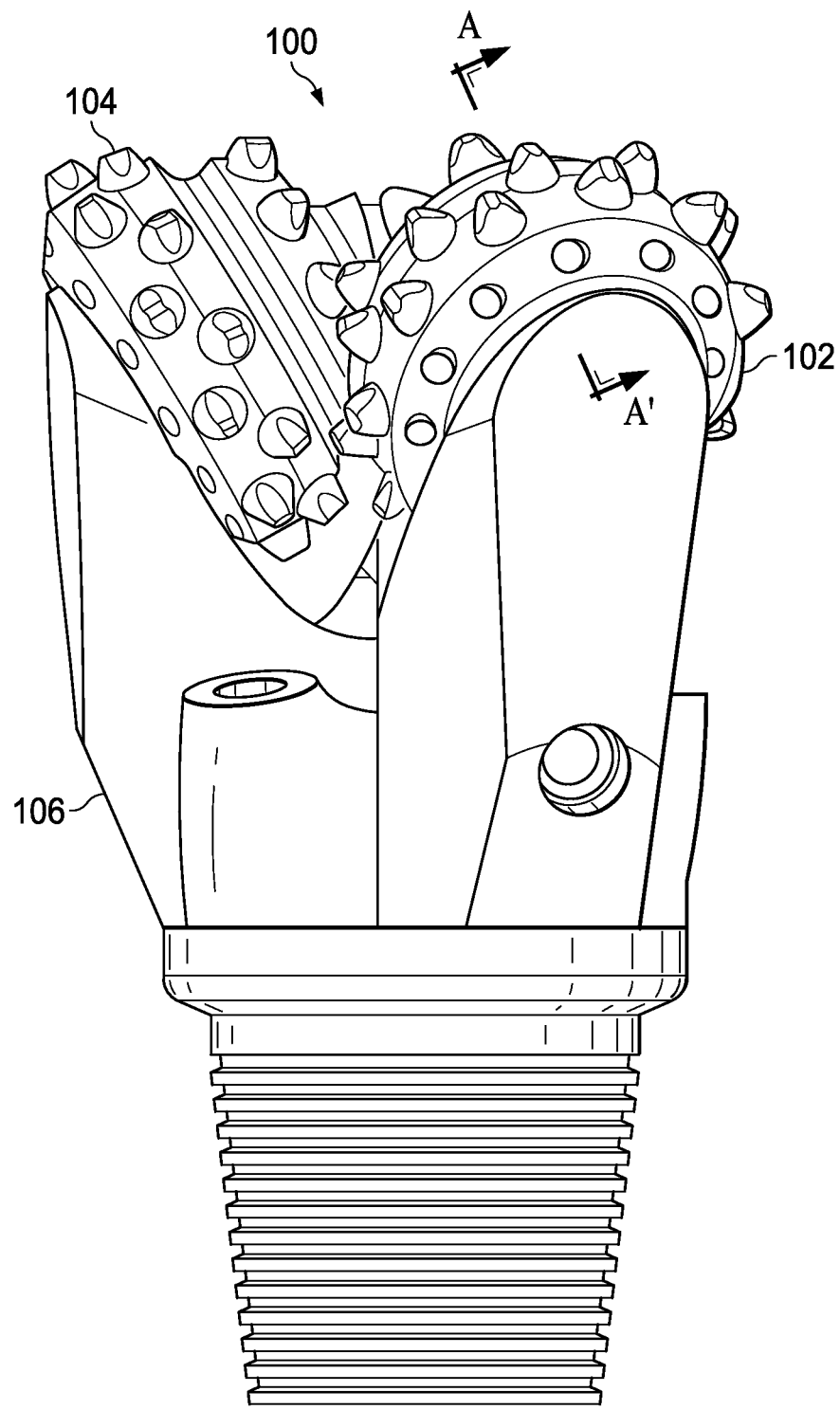
FIG. 1 illustrates a perspective view of one embodiment of a roller cone drill bit.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the apparatus, systems, and methods disclosed herein. It is understood that other embodiments may be utilized and that logical structural, mechanical, electrical, and chemical changes may be made without departing from the spirit or scope of the disclosure. To avoid detail not necessary to enable those skilled in the art to practice the embodiments described herein, the description may omit certain information known to those skilled in the art. The following detailed description is therefore not to be taken in a limiting sense and the scope of the illustrative embodiments is defined only by the appended claims.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion and, thus, should be interpreted to mean "including, but not limited to." Unless otherwise indicated, as used throughout this document, "or" does not require mutual exclusivity.

Disclosed herein are systems, tools, and methods for improving the performance of a drill bit, including by selectively applying particular low-friction coatings to strategic locations on the surface of the drill bit. In one aspect, the particular materials and their selective placement on the bit expose the materials to friction from drill bit rotation, and allow such materials to "grow" and bond when exposed to frictional forces. This may provide "self-healing" properties to drill bit, such as to resist further damage when minor damage such as small chips occur. The coating may be applied to matrix drill bits, in particular, but may also be suitable for application to other types of drill bits. In the case of a matrix drill bit, the powder component of the matrix drill bit, which may also be referred to as a "particulate phase", may be coated with low friction material following fabrication of the drill bit. In many cases, the low friction material may be polytetrafluoroethylene or other suitable material. The matrix drill bit may be a roller cone drill bit, a fixed cutter drill bit, or any other type of drill bit.

The systems and methods described herein provide for the introduction of a friction-reducing additive material into the particulate phase (or powder component) of a matrix drill bit during fabrication of the drill bit body. The introduction of friction-reducing additive to the drill bit particulate phase may reduce the propensity for drill cuttings to stick to the surface of the drill bit during drilling. Low friction coatings may also be applied to the outer portion of the drill bit with the same goal in mind. Such coatings, however, tend to wear away during operation, resulting in a drill bit that is unprotected from cuttings, muds, or other materials that may stick to the drill bit. Such wear may happen quickly during drilling because the drill bit is operating in an extreme environment, sometimes removing very hard materials from the well-bore at high temperatures and pressures. Operation in this type of extreme environment increases the likelihood that the drill bit will experience chips and nicks that would penetrate a low-friction layer of material that coats only the outermost surface of the drill bit.

In an illustrative embodiment, a friction-reducing additive is combined with a substrate material of a matrix drill bit in the early stages of fabrication. This combined material is placed in a mold, and binding material is added with heat to form the matrix drill bit. The friction-reducing additive may be polytetrafluoroethylene powder or nano-powder, or a similar type of low friction material with high heat resistance. The substrate material is typically a tungsten carbide in powder, casted particle, or mono-crystalline form. In an embodiment, the friction-reducing additive includes tungsten carbide particles coated with polytetrafluoroethylene prior to mixing or compounding with additional tungsten carbide to form particulate phase. The friction-reducing additive may be mixed with the substrate material of the matrix drill bit to provide consistent friction characteristics throughout the body of the drill bit so that as the drill bit erodes, newly exposed surfaces of the drill bit will have a similarly low friction coefficient.

The friction-reducing additive may be used to reduce the static friction coefficient of the body of a drill bit body relative to the friction coefficient of a drill bit body that does not include the friction-reducing additive. For example, a matrix drill bit that includes tungsten carbide as a particulate phase and copper as a binding material may have a friction coefficient of, for example, 0.2-0.35. The friction-reducing additive may have much lower friction coefficient of, in the case of polytetrafluoroethylene, for example, 0.04. The static friction coefficient of the surface of a drill bit body may be substantially reduced by including a friction-reducing additive component in the particulate phase of a matrix drill bit that would otherwise be composed of tungsten carbide and copper or cobalt.

The lower coefficient of friction on the surface provides for a lower chance of drill cuttings to adhere or stick to the matrix material in the junk slot area, which is the area of the drill bit between cutting surfaces where cuttings migrate away from the cutting surfaces of the drill bit. The lower coefficient of friction also reduces the loss due to wear on the drill bit surface by reducing friction between the drill bit and solids suspended in the fluid surrounding the drill bit during drilling.

Referring now to the figures, FIG. 1 indicates a cross-section through section line A-A' of an embodiment of a roller cone drill bit that includes a friction-reducing additive. The roller cone drill bit 100 is a common type of drill bit used in wellbore drilling, but is merely an example of a commonly used type of drill bit. The concepts, systems and methods described herein may be used in a variety of drill bits such as, for example, fixed cutting element drill bits. In the roller cone drill bit 100, rotating cones 102 have teeth 104, which may be carbide inserts or milled type teeth, on their outer surface. Each tooth is mounted on an arm 106 of the drill bit body.

Figure 2:
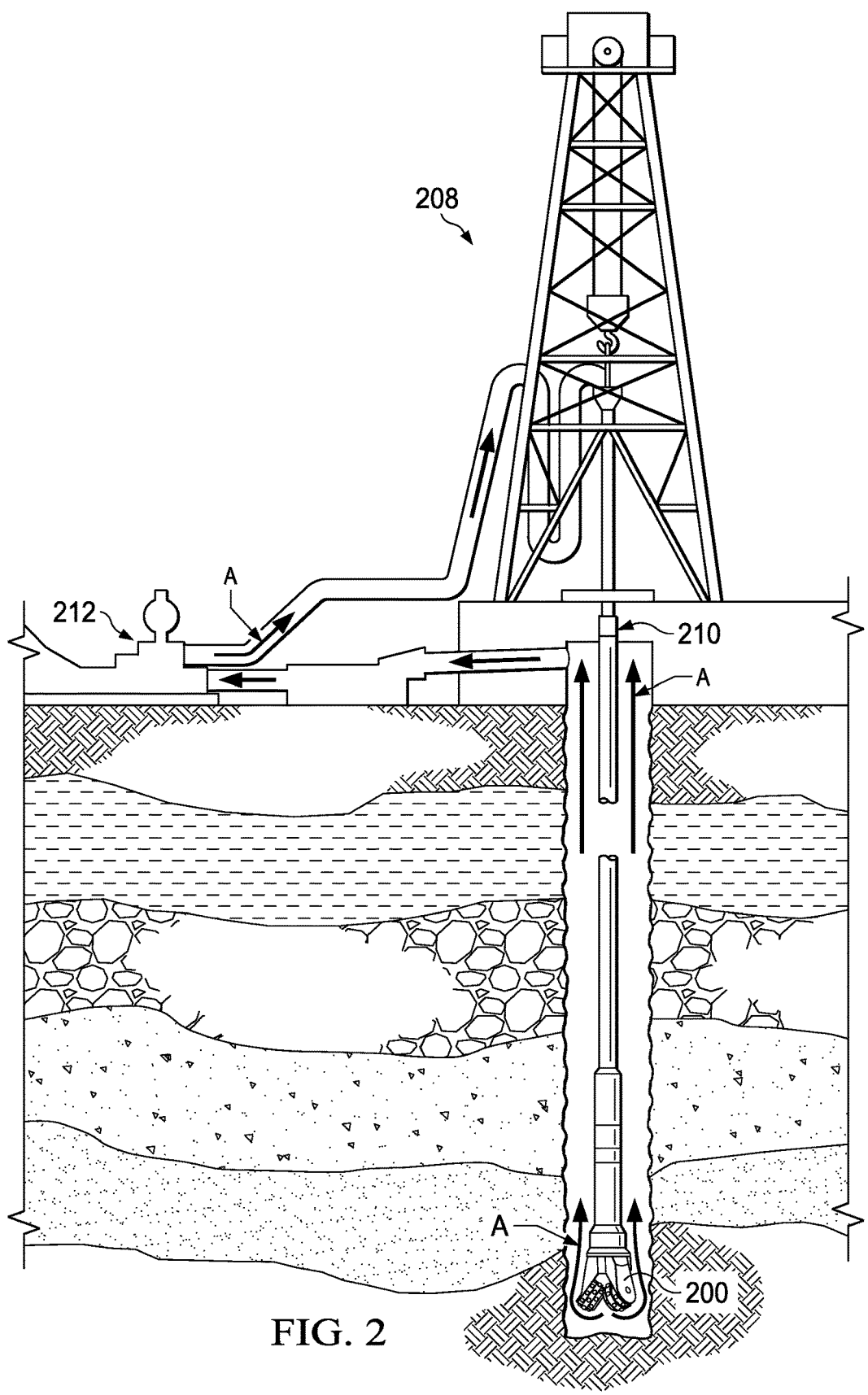
FIG. 2 illustrates an elevation view of one embodiment of a drill deployed in a drilling operation.

FIG. 2 depicts such a drill bit 200 operating in a drill string to form a wellbore. During drilling, as illustrated in FIG. 2, a drill rig 208 uses sections of pipe 210 to transfer rotational force to the drill bit 200 and a pump 212 to circulate drilling fluid (as illustrated by flow arrows A) to the bottom of the wellbore through sections of the pipe 210. As the drill bit 200 rotates, the applied weight-on bit ("WOB") forces the downward pointing teeth of the rotating cones into the formation being drilled. The WOB, applied through the points of the teeth, applies a compressive stress to the formation that exceeds the yield stress of the formation and induces fracturing of formation material under the drill bit. The fracturing results in fragments (also referred to as cuttings) that are flushed away from the cutting surfaces of the drill bit 200 by the drilling fluid, which may also be referred to as drilling mud.

Despite the flushing away, cuttings contained in the drilling mud may adhere to the surface of a traditional bit, which may cause the drill bit to not function properly or to stall. To keep the bit in proper operation, the drilling fluid adds lubrication to prevent sticking and carries cuttings away from the bit. The drill bit may also include a lubricating outer layer to further reduce the chance for cuttings to adhere to the drill bit. The outer layer of the bit may be worn away through use, however, which may result in the outermost layer of the bit losing the lubricating element. In an illustrative embodiment, a friction-reducing material may be added to a powder component of the matrix drill bit to provide a wear-resistant low-friction drill bit. The friction-reducing additive may be polytetrafluoroethylene (hereinafter "PTFE") powder or another suitable low-friction material, as noted above.

When interacting with an opposing surface such as a wellbore wall, PTFE embedded in the drill bit may undergo the molecular process of scission, creating active PTFE groups that chemically react with the bit surface on which the PTFE is deployed. This scission results in strong adhesion to the bit surface and causes growth in, as well as reorientation of, PTFE crystallites in a very thin subsurface region of the bulk polymer PTFE embedded in the drill bit. Such structural rearrangement assists in joining adjacent aligned PTFE crystallites to form films and ribbons that emerge as debris. The PTFE debris is also a low-friction material that may be useful as lubricator. Thus, PTFE dispersed within the powder component of a matrix drill bit may, in response to chipping and wear, effectively grow a new low friction surface when previously unexposed portions of PTFE infused drill bit material becomes exposed to the drilling environment after damage to the drill bit in the form of cracking, chipping, or other types of wear.

When included in a matrix-type drill bit, the PTFE may be mixed in with the powder ingredient of, for example, a tungsten carbide, steel, ceramic, or other matrix drill bit. Despite the low friction characteristics of PTFE (typically associated with resistance to adhesion), the powder portion of the drill bit still sufficiently holds together because at low sliding speeds, the PTFE demonstrates good adhesion. This adhesion, combined with the surface layer adhesion resulting from the scission-related chemical changes noted above result in a drill bit body that has a low-friction surface along with a high degree of toughness and resistance to fracture.

In an illustrative embodiment of a PTFE impregnated drill bit, PTFE is incorporated into the powder component of the bit, which is typically tungsten carbide or a similarly hard material. The PTFE may be incorporated in the powder component, either by bonding it to the powder component or mixing it with the powder component to form a PTFE impregnated or infused powder. The PTFE impregnated powder may be (i) inserted in a mold or otherwise suspended so that it will remain diffused throughout the drill bit, or (ii) added to a drill bit matrix such that PTFE only diffuses in the outer most portion of the drill bit. This outermost portion is the portion of the drill that may be exposed to a well-bore wall over the life of the drill bit, and may range from a couple of millimeters to tens of centimeters thick or more depending on the size and design of the drill bit. In these embodiments, the outer surface of the drill bit may also be lubricated with a separate coating of PTFE or a similar friction-reducing material.

The PTFE impregnated materials may reduce the tendency of clay particles and larger, agglomerated masses of cuttings from sticking to a drill bit surface. This holds true even as the drill bit experiences wear. The ability of PTFE to effectively grow and bond when exposed to frictional forces results in the drill bit functioning as a self-healing drill bit when small chips occur to expose new areas of PTFE impregnated material.

Figure 3:
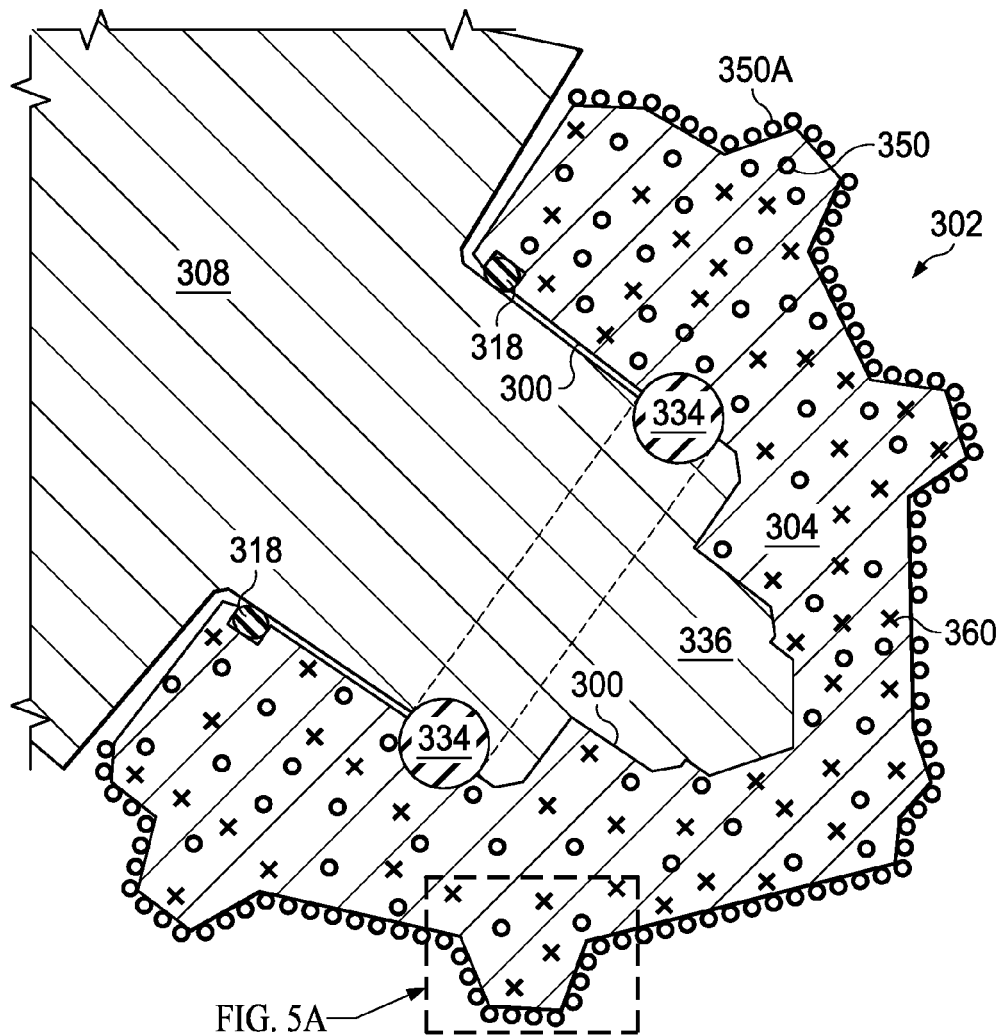
FIG. 3 illustrates a cross-section view, taken along section line A-A' of FIG. 1, of an embodiment of a roller cone drill bit of FIG. 1 that includes a friction-reducing additive.

Referring again to the figures, FIG. 3 illustrates a cross-sectional diagram of a portion of a roller cone bit 302 having a matrix drill bit head including PTFE for friction reduction. The roller cone bit 302 includes a roller cone 304 joined to a support arm 308, respectively. The roller cone 304 is supported on bearings 334 and a spindle 336. A compressible sealing element 318 is included to seal a gap 300 between the roller cone 304 and spindle 336. The roller cone 304 may be composed of tungsten carbide 360 (indicated by an "x" particle), friction-reducing material 350 (indicated by an "o" particle), and a binder material, which may be (copper, cobalt, or another binder). In some configurations, the friction-reducing material 350 is PTFE. In this case, the friction-reducing material 350 may encounter frictional forces at the surface of roller cone 304 when exposed to frictional forces during operation of the drill bit. The rubbing of wellbore materials on exposed friction-reducing material 350A causes growth in the friction-reducing material 350, causing a more complete and smooth layer of friction-reducing material 350 to be formed. The exposed friction-reducing material 350 may be a PTFE coating layer applied after the sintering and formation of the drill bit, or a layer occurring as a result of friction-reducing material 350 being sintered into the drill bit.

Figure 4:
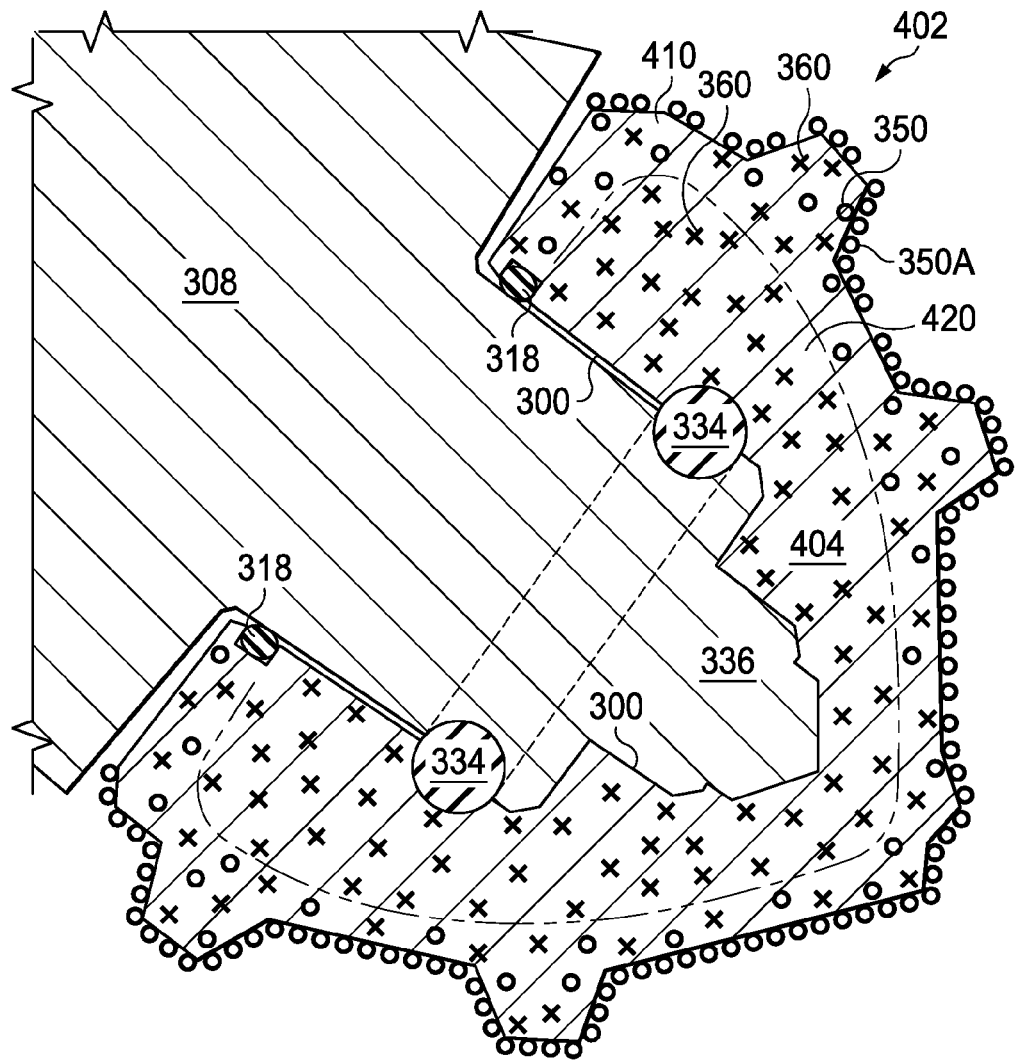
FIG. 4 illustrates a cross-section of a second embodiment of a roller cone drill bit that is analogous to the roller cone drill bit of FIG. 3.

FIG. 4 illustrates a cross-section through A-A' of a second illustrative embodiment of a roller cone drill bit 402 that is analogous to the roller cone drill bit 302 shown in FIG. 3, which also includes a friction-reducing additive. In this embodiment, the roller cone is a multi-layer roller cone 404 that is subdivided into two areas, outer area 410 and inner area 420. The outer area 410 includes the friction-reducing material 350 and the inner area 420 does not include the friction-reducing material 350, resulting in an enhanced matrix drill bit 402. The outer area 410 and inner area 420 may be joined together using selective laser sintering (SLS) or any other suitable bonding mechanism to create the multilayer roller cone 404.

In an embodiment, to lubricate the multilayer roller cone 404, a material matrix containing tungsten carbide 360, friction-reducing additive 350, and a binder (e.g., copper) may be placed into a mold. This may be a single mold or a mold containing an inner portion and an outer portion such that the material to be molded is held against the sides of the mold while leaving a cavity or hollow inner portion that may be later filled with the inner area 420. The material matrix is placed in the boundary layer of the outer area 410 and sintered. The remaining area, which corresponds to the inner area 420, is then filled with tungsten carbide 360 and a binder (such as copper or cobalt) and sintered as well. SLS may be used to only heat specific areas of the multi-layer roller cone 404 to a temperature sufficient for diffusion to occur. In this way, a rough barrier may be maintained between the outer area 410 and the inner area 420, although some diffusion may occur between the layers such that particulates may be found in those areas. Alternatively, the mold may be completely filled in a method that will provide for tungsten carbide 360, friction-reducing material 350, and the binder in outer area 410 and tungsten carbide 360 and a binder (copper) in the inner area 420. The areas then may be selectively sintered using SLS. Again, in operation, the sliding of wellbore materials on the exposed friction-reducing material 360A causes growth in the friction-reducing material, causing a more complete and smooth surface layer to be formed. The exposed friction-reducing material may be an initial coating layer applied after the sintering and formation of the drill bit or a layer occurring as a result of PTFE being sintered into the drill bit.

Figure 5A:
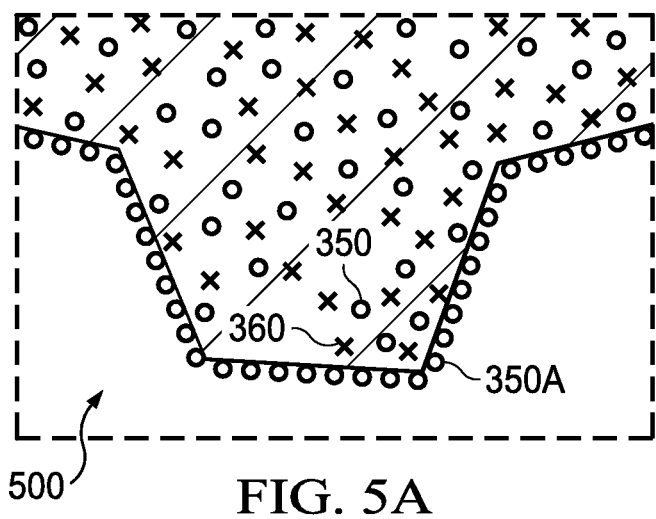
FIGS. 5A and 5B are detail views of the drill bit of FIG. 3, prior to and following chipping, respectively.
Figure 5B:
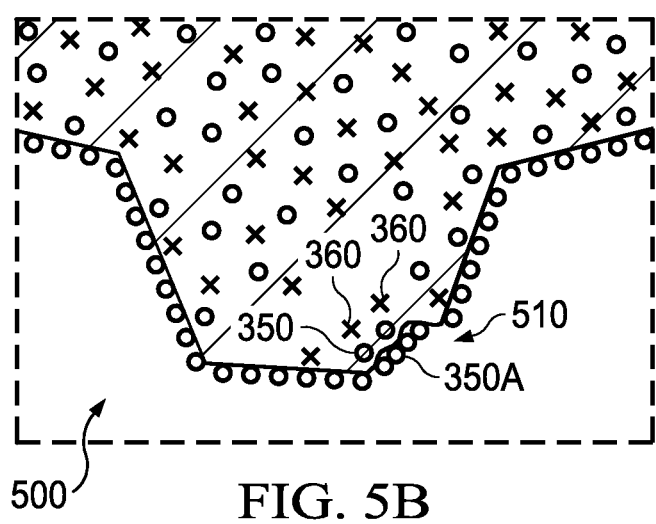

FIGS. 5A and 5B illustrate detail views of the chipping of a drill bit cutting element 500, as indicated in FIG. 3. The illustration is a conceptual representation of the chipping or wearing away process of the drill bit cutting element 500 and the reformation of an outer layer of friction-reducing material 350A. Initially, the existing outer layer of friction-reducing material 350A is exposed to the drilling environment while lubricating elements 350 and powder component 360 are interior to the drilling environment and held together by a binding component. When a chip 510 occurs, as shown in FIG. 5B, new friction-reducing material 350 is exposed and grows under friction to reform lubricating layer 350A resulting from the scission reactions described previously. The ability of the friction-reducing material to grow and bond under friction, as noted above, effectively makes the lubricating layer "self-healing" because the friction-reducing material 350 reforms the lubricating layer 350A as the friction-reducing material 350 is exposed to frictional forces in the wellbore.

Figure 6:
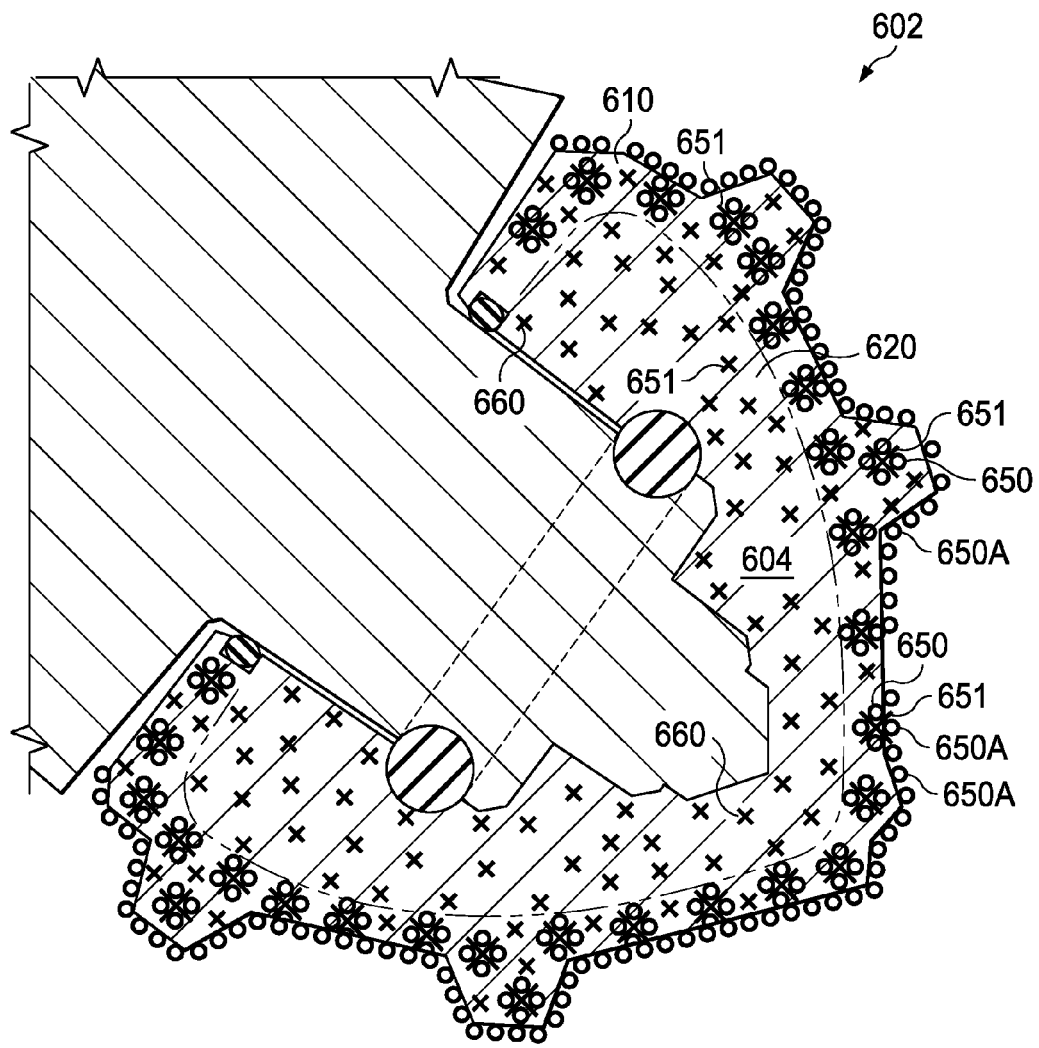
FIG. 6 illustrates a cross-section of a third embodiment of a roller cone drill bit that is analogous to the roller cone drill bit of FIG. 4.

FIG. 6 illustrates a cross-section of a third illustrative embodiment of a roller cone drill bit 602 that is analogous to the roller cone drill bits described above. The roller cone drill bit 602 includes a cone 604 and is similar to the roller cone bit 402 of FIG. 4, primarily differing in that the friction-reducing material 650 is rebounded to the tungsten carbide powder or particles. In this embodiment, roller cone 604 is again subdivided into two areas, outer area 610 and inner area 620. The outer area 610, includes a particulate phase 651 of pre-bonded groupings 651 of friction-reducing material 650 and tungsten carbide 660, and the inner area 620 includes tungsten carbide 660 and binder material without a friction-reducing material 650. Alternatively, in some embodiments, tungsten carbide may be left out of the inner layer 620 in favor of the binder material or another substrate material.

A purpose of the particulate phase is to provide for hardness to the matrix drill bit. Similarly, the purpose of the binder is to provide durability to the matrix drill bit. Since hardness is not as necessary for unexposed areas, however, the particulate phase may be omitted or reduced in concentration in the inner area 620. Selective Laser Sintering (SLS) may be utilized to create the multilayer roller cone 604, as described previously with regard to FIG. 4.

Figure 7:
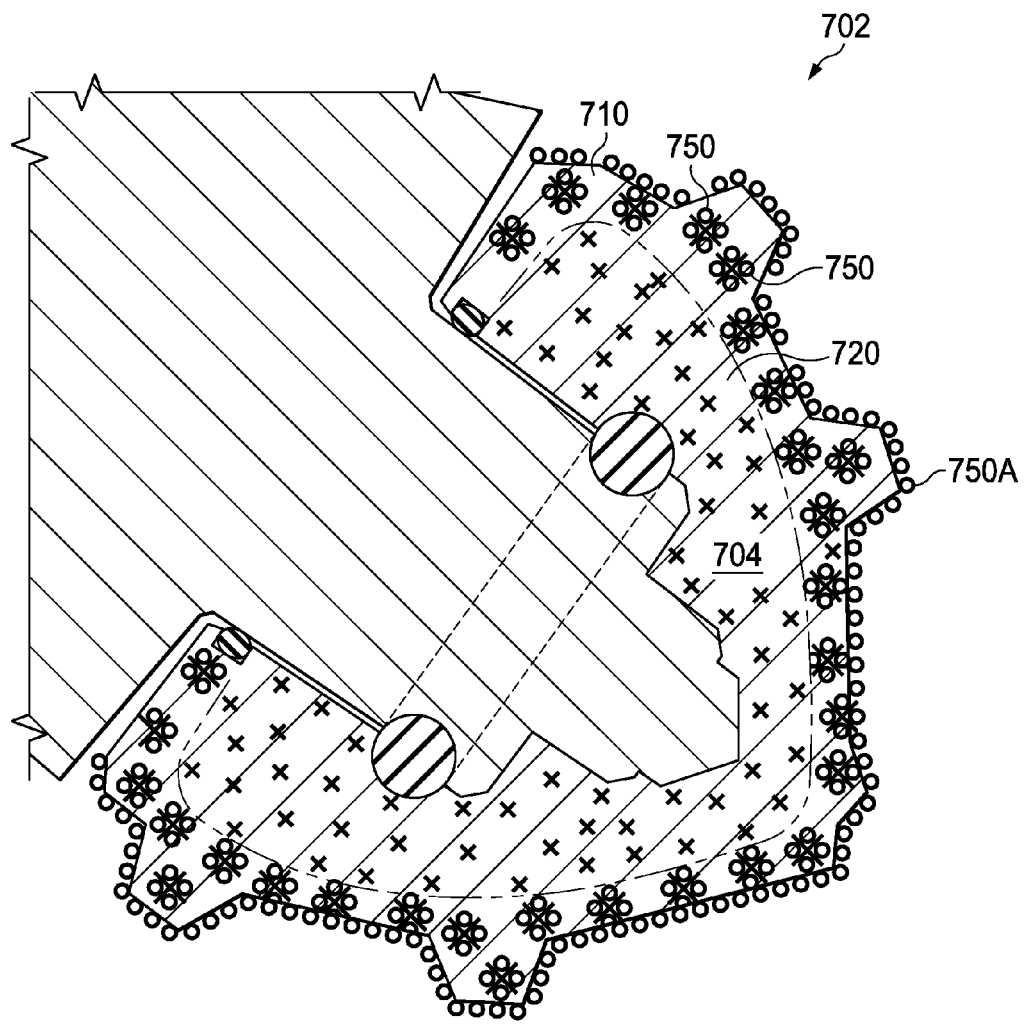
FIG. 7 illustrates a cross-section of a fourth embodiment of a roller cone drill bit that is analogous to the roller cone drill bit of FIG. 6.

FIG. 7 illustrates a cross-section of a fourth embodiment of a roller cone drill bit 702 that includes a friction-reducing additive 750 and roller cone 704. The roller cone drill bit 702 of FIG. 7 is similar to that of FIG. 6, primarily differing in that a lubricating outer layer of the friction-reducing material 750A is added after sintering using, for example, sintering or a primer and topcoat process. In this embodiment, roller cone 704 is subdivided into two areas, outer area 710 and inner area 720. The outer area 710, includes tungsten carbide 760 with friction-reducing material 750 and the inner area 720 includes a tungsten carbide 760 without the friction-reducing material 750. The formation of the roller cone of drill bit 702 may be nearly identical to the formation of the collar cone drill bit 602 described with regard to FIG. 6, except that the outer lubricating layer 750A may be added by sintering a layer of friction-reducing material 750 to the outer area 710 or adding an additional layer of friction-reducing material 750 using, for example, a primer and topcoat process. As with the roller cone drill bits described above, when chips occur, friction-reducing material 750 that is bonded to the underlying tungsten carbide 760 will grow together with the outer layer of friction-reducing material 750A.

Figure 8:
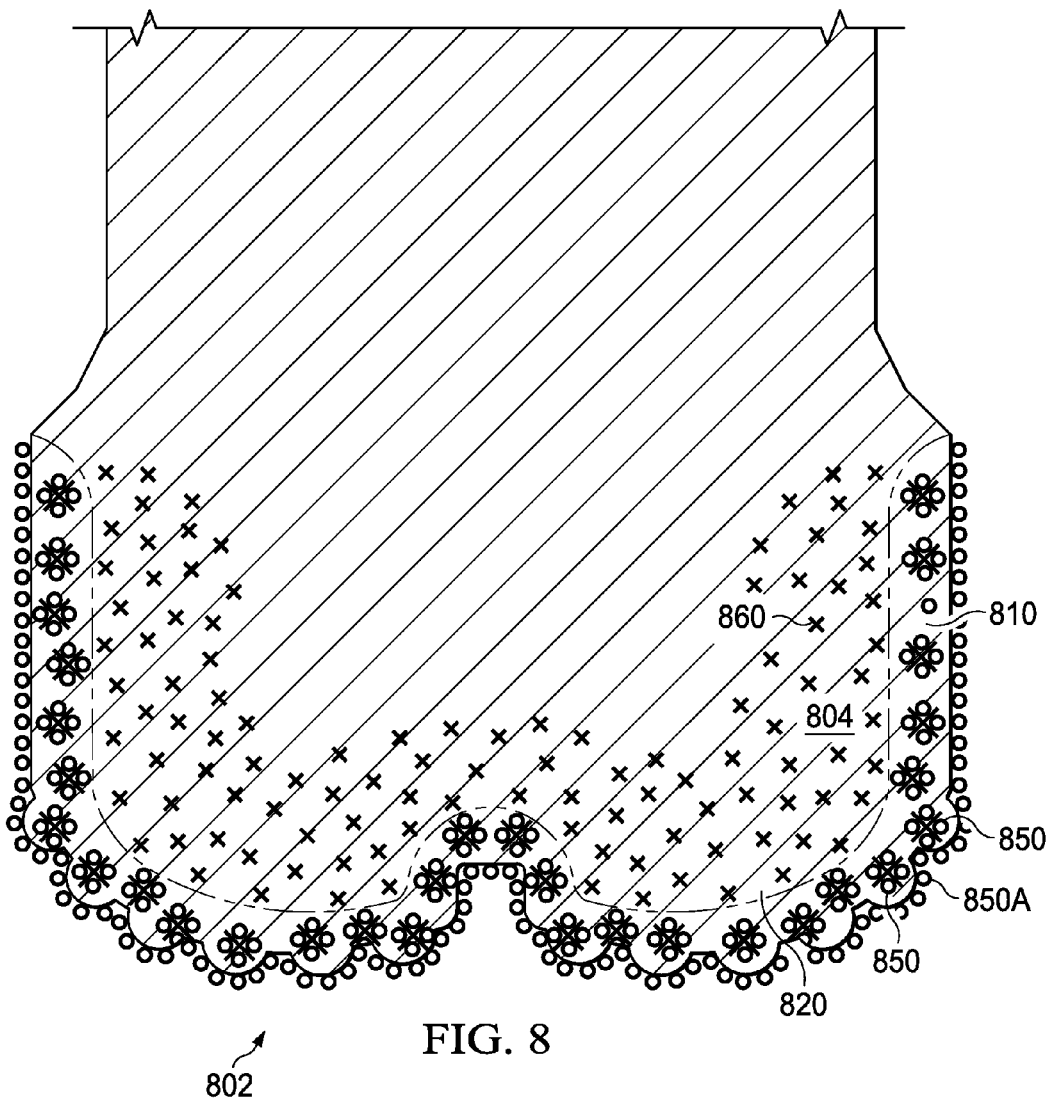
FIG. 8 illustrates a cross-section of an embodiment of a fixed cutter drill bit that includes a friction-reducing additive.

FIG. 8 is a cross-section of an alternative embodiment of a drill bit 804 showing a cross-section of a fixed cutter drill bit 804 similar to that of the roller cone cross-section shown in FIG. 7. The drill bit 804, however, is a fixed cutter drill bit 804. In this embodiment, fixed cutter drill bit 804 is subdivided into two areas, outer area 810 and inner area 820. The outer area 810 includes tungsten carbide 860 with friction-reducing material 850 and the inner area 820 includes tungsten carbide 860 without the friction-reducing material 850. Alternatively in some embodiments, tungsten carbide 860 may be left out of the inner area 820 altogether in favor of an alternative substrate material, such as the binder material. The drill bit 804 may be constructed using, for example, the SLS fabrication method described above, or any other suitable fabrication method. Like the roller cone bit embodiments described above, the areas 810 and 820 then may be selectively sintered via SLS or a similar process. After formation, an outer layer of the friction-reducing material 850A may be, for example, added. As chips occur, friction-reducing material that is bonded to the tungsten carbide will grow together with the outer layer of friction-reducing material 850A. It is noted that the concepts described herein may be applied to the fixed cutter bit depicted in FIG. 8 in any of the example drill bits described herein, and in other types of drill bits that incorporate a matrix drill bit portion.

The erosion resistance of a drill bit, such as a roller cone or fixed cutter drill bit, is an important factor to consider in selecting a drill bit that is able to continuously perform under drilling conditions. Drill bits that erode quickly may need to be replaced frequently, interrupting and addition expense to the drilling process. Increased erosion resistance of the drill bit, however, may allow for more continuous and efficient drilling operations. This disclosure describes systems, tools, and methods for providing a drill bit using a friction-reducing additive in the body of the drill bit. The friction-reducing additive increases erosion resistance. In addition to the embodiments described above, many examples of specific combinations are within the scope of the disclosure, some of which are detailed in the following examples:

Example 1

A drill bit including:
a molded matrix drill bit body comprising a particulate phase and a binder material; and
at least one cutting element;
wherein the particulate phase comprises a tungsten carbide component and a friction-reducing additive component, the friction reducing additive component having a lower coefficient of friction than the tungsten carbide component; and
wherein the friction-reducing additive component comprises polytetrafluoroethylene and is dispersed within at least a portion of the matrix drill bit body.

Example 2

The drill bit of example 1, wherein the friction-reducing additive component comprises polytetrafluoroethylene-coated tungsten carbide particles.

Example 3

The drill bit of example 1 or 2, wherein:
the matrix drill bit body comprises an outer area and an inner area;
the outer area comprises the particulate phase having polytetrafluoroethylene dispersed therein; and
the inner area comprises a second particulate phase that does not include polytetrafluoroethylene.

Example 4

The drill bit of example 3, further comprising a surface coating of polytetrafluoroethylene applied to the outer area.

Example 5

The drill bit of example 3 or 4, wherein the outer area has a thickness of more than two millimeters.

Example 6

The drill bit of example 3 or 4, wherein the outer area has a thickness of more than ten centimeters.

Example 7

The drill bit of example 1 or 2, wherein:
the matrix drill bit body comprises an outer area and an inner area;
the outer area comprises the particulate phase having polytetrafluoroethylene dispersed therein; and
the inner area comprises a second particulate phase that does not include tungsten carbide.

Example 8

The drill bit of any of examples 1-7, wherein the matrix drill bit body further comprises a surface coating of polytetrafluoroethylene.

Example 9

The drill bit of example 1, wherein the binder material comprises copper.

Example 10

The drill bit of example 1, wherein friction-reducing additive component embedded in the matrix drill bit body is operable to grow and bond an outer surface comprising the friction-reducing additive component in response to exposure to frictional forces following damage to the surface of the drill bit body.

Example 11

A method of forming a matrix drill bit body, the method comprising:
placing particulate phase and a binding material in a mold, the particulate phase comprising a tungsten carbide particulate and a polytetrafluoroethylene particulate; and
sintering the particulate phase and binding material to form the matrix drill bit body;
wherein sintering the particulate phase and binding material includes causing polytetrafluoroethylene to diffuse into the tungsten carbide particulate.

Example 12

The method of example 11, further comprising bonding polytetrafluoroethylene to tungsten carbide particles to form the polytetrafluoroethylene particulate prior to placing particulate phase and a binding material in a mold.

Example 13

The method of example 11 or 12, wherein sintering the particulate phase and binding material to form the matrix drill bit body comprises sintering the particulate phase and binding material to form an outer area of the matrix drill bit body, the method further comprising:
placing a second particulate phase that does not include polytetrafluoroethylene in a cavity formed by the outer area of the matrix drill bit body; and
sintering the second particulate phase to form an inner area of the matrix drill bit body; and
using selective laser sintering to form a barrier between the inner area and the outer area that prevents diffusion of polytetrafluoroethylene into the inner area.

Example 14

The method of example 11 or 12, wherein sintering the particulate phase and binding material to form the matrix drill bit body comprises sintering the particulate phase and binding material to form an outer area of the matrix drill bit body, the method further comprising:
placing a second particulate phase that does not include tungsten carbide in a cavity formed by the outer area of the matrix drill bit body; and
sintering the second particulate phase to form an inner area of the matrix drill bit body; and
using selective laser sintering to form a barrier between the inner area and the outer area that prevents diffusion of polytetrafluoroethylene into the inner area.

Example 15

The method of example 13 or 14, further comprising applying a low friction coating to an outer surface of the outer area.

Example 16

The method of example 15, wherein the low friction coating comprises a topcoat of polytetrafluoroethylene.

Example 17

The method of any of examples 11-16, further comprising forming a friction-reducing layer on an outer surface of the matrix drill bit body by operating a drill bit that includes the matrix drill bit body to form a wellbore.

Example 18

The method any of examples 11-16, further comprising forming an outer surface comprising polytetrafluoroethylene by exposing the matrix drill bit body to frictional forces.

Example 19

The method of example 17 wherein forming the friction-reducing layer further comprises regenerating a portion of the outer lubricating layer by continuing to operate the drill bit after the drill bit is chipped to remove a portion of the outer lubricating layer.

Example 20

A well formation system comprising a drill string, the drill string having a low surface friction drill bit, wherein the low surface friction drill bit comprises:
at least one cutting element and a molded matrix drill bit body comprising a particulate phase and a binding material, the particulate phase including tungsten carbide and polytetrafluoroethylene;
wherein the polytetrafluoroethylene is dispersed throughout at least a portion of the matrix drill bit body.

Example 21

The well formation system of example 20, wherein:
the matrix drill bit body further comprises an inner area and an outer area;
the outer area comprises the particulate phase and the binding material;
the inner area consisting of a material that does not include polytetrafluoroethylene; and
a barrier that prevents diffusion of the polytetrafluoroethylene to the inner area.

Example 22

The well formation system of claim 20 or 21, wherein the matrix drill bit body comprises a roller cone drill bit body having a low friction coating applied to an outer surface of the roller cone drill bit body.

It should be apparent from the foregoing that the various features embodied in the disclosed example embodiments are not limited to only those example embodiments. Various changes and modifications are possible without departing from the spirit thereof.

I claim:
1. A drill bit including: a molded matrix drill bit body comprising a particulate phase and a binder material; and at least one cutting element; wherein the particulate phase comprises a tungsten carbide component and a friction-reducing additive component, the friction-reducing additive component having a lower coefficient of friction than the tungsten carbide component; and wherein the friction-reducing additive component comprises polytetrafluoroethylene and is dispersed within at least a portion of the matrix drill bit body, wherein: the matrix drill bit body comprises an outer area and an inner area; the outer area comprises the particulate phase having polytetrafluoroethylene dispersed therein; and the inner area comprises a second particulate phase that does not include polytetrafluroethylene.

2. The drill bit of claim 1, wherein the friction-reducing additive component comprises polytetrafluoroethylene-coated tungsten carbide particles.

3. The drill bit of claim 1, further comprising a surface coating of polytetrafluoroethylene applied to the outer area.

4. The drill bit of claim 1, wherein the outer area has a thickness of more than two millimeters.

5. The drill bit of claim 1, wherein the outer area has a thickness of more than ten centimeters.

6. The drill bit of claim 1, further comprising a surface coating of polytetrafluoroethylene applied to the outer area.

7. The drill bit of claim 1, wherein:
the matrix drill bit body comprises an outer area and an inner area;
the drill bit further comprises a surface coating of the friction-reducing additive component applied to the outer area; and
the friction-reducing additive component dispersed within at least a portion of the matrix drill bit body is operable to bond to the friction-reducing additive component in the surface coating in response to exposure to frictional forces following damage to a surface of the drill bit body comprising the surface coating.

8. The drill bit of claim 1, wherein the matrix drill bit body further comprises a barrier that prevents diffusion of the polytetrafluoroethylene to the inner area.

9. The drill bit of claim 1, wherein the matrix drill bit body comprises a roller cone drill bit body having a low friction coating applied to an outer surface of the roller cone drill bit body.

* * * * *